United States Patent
Nunokawa

(10) Patent No.: US 7,443,522 B2
(45) Date of Patent: Oct. 28, 2008

(54) PRINTING APPARATUS FOR CONTROLLING PRINT ACCORDING TO PRINTING ENVIRONMENT

(75) Inventor: Hirokazu Nunokawa, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 1083 days.

(21) Appl. No.: 10/170,407

(22) Filed: Jun. 14, 2002

(65) Prior Publication Data

US 2002/0196457 A1 Dec. 26, 2002

(30) Foreign Application Priority Data

Jun. 19, 2001 (JP) ............................... 2001-185148

(51) Int. Cl.
*G06F 15/00* (2006.01)
*G06K 1/00* (2006.01)
*G06K 15/00* (2006.01)
*H04N 1/60* (2006.01)

(52) U.S. Cl. ........................................ 358/1.14; 358/1.9

(58) Field of Classification Search ......... 358/1.1–1.18; 340/5.7, 5.61, 5.71, 5.72, 5.8; 463/1, 42
See application file for complete search history.

(56) References Cited

U.S. PATENT DOCUMENTS

| 6,688,973 | B2 * | 2/2004 | Satloff et al. .................... 463/1 |
| 7,119,662 | B1 * | 10/2006 | Horiguchi et al. ............ 340/5.7 |
| 7,369,048 | B2 * | 5/2008 | Freund ..................... 340/572.1 |

FOREIGN PATENT DOCUMENTS

| JP | 10-305566 A | 11/1998 |
| JP | 11-138861 | 5/1999 |
| JP | 2001-105636 | 4/2001 |
| WO | WO 98/52762 | 11/1998 |

* cited by examiner

*Primary Examiner*—Douglas Q Tran
(74) *Attorney, Agent, or Firm*—Sughrue Mion, PLLC

(57) ABSTRACT

A printing apparatus having a read-in device operative to read in printing-environment characteristic information recorded on a first recording device provided on the printing medium, the printing-environment characteristic information indicating a printing-environment characteristic of the printing medium. The printing apparatus further having a control device operative to control a printing process based on the printing-environment characteristic information read in by the read-in device.

29 Claims, 9 Drawing Sheets

PRINTING-ENVIRONMENT TABLE FOR PLAIN PAPER
RECORDED ON ROLL-PAPER MEMORY

COLOR-CONVERSION TABLE FOR PLAIN PAPER
RECORDED ON ROLL-PAPER MEMORY

PASS-REST TIME-LENGTH TABLE FOR PLAIN PAPER RECORDED ON ROLL-PAPER MEMORY 51

| HUMIDITY (%) / TEMP. (°C) | 80~76 | 75~71 | ... |
|---|---|---|---|
| 40 ~ 38 | NORMAL: 3 SEC.<br>INTERLACE: 4 SEC.<br>INTERLACE + SINGLING: 5 SEC. | NORMAL: 2.5 SEC.<br>INTERLACE: 3.5 SEC.<br>INTERLACE + SINGLING: 4.5 SEC. | ... |
| 37 ~ 35 | NORMAL: 2.5 SEC.<br>INTERLACE: 3.5 SEC.<br>INTERLACE + SINGLING: 4.5 SEC. | NORMAL: 2.0 SEC.<br>INTERLACE: 3.0 SEC.<br>INTERLACE + SINGLING: 4.0 SEC. | ... |
| ... | ... | ... | |

FIG. 4

TABLE-CORRECTING-METHOD INFORMATION ⟵ 41

| KIND | PRINTER A | PRINTER B | ... |
|---|---|---|---|
| NEED FOR CORRECTION | PRINTING-ENVIRONMENT TABLE = AS IT IS<br><br>PASS-REST TIME-LENGTH TABLE = AS IT IS<br><br>COLOR-CONVERSION TABLE = AS IT IS | PRINTING-ENVIRONMENT TABLE = MAKE CORRECTION (CORRECTING METHOD...)<br><br>PASS-REST TIME-LENGTH TABLE = MAKE CORRECTION (CORRECTING METHOD...)<br><br>COLOR-CONVERSION TABLE = MAKE CORRECTION (CORRECTING METHOD...) | ... |

FIG. 7

PRINTING APPARATUS FOR CONTROLLING PRINT ACCORDING TO PRINTING ENVIRONMENT

BACKGROUND OF THE INVENTION

The present application claims priority upon Japanese Patent Application No. 2001-185148 filed on Jun. 19, 2001, which is herein incorporated by reference.

1. Field of the Invention

The present invention relates to a technique for controlling print according to printing environment; and particularly, relates to controlling of printing which uses such as a long rolled-up printing medium (hereinafter referred to as rolled printing medium).

2. Description of the Related Art

For example, in printing with an inkjet printer, there generally occurs a difference in image quality of a printed image according to the kind of paper and/or printing environment (especially temperature and humidity) including the inside environment of the printer. This is because the above-mentioned printing environment has a large influence on, for example, the manner of ink-drop penetration and drying.

Specifically, for example, if the kind of paper is a paper for exclusive use (such as a film-type glossy paper) where it is relatively hard for ink drops to penetrate, and if the inside of the printer is of high temperature and is highly humid, it will take a relatively long time for the ink drops to dry. However, regardless of this face, if normal printing is carried out, deterioration in image quality may occur in that, for example, another set of ink drops will be discharged to a position adjacent the discharged ink drops before they dry, and the molecules of these ink drops will be attracted to each other and get mixed (cohesion of ink will occur). Further, in such a circumstance, other problems may arise in that, for example, the ink drops which are not dry will adhere to the paper-feed roller upon paper feed, and the paper-feed roller will become dirty.

Therefore, it is desirable to be able to control printing according to both the kind of paper and the printing environment including the inside of the printer. However, among conventional art, there is no technique for carrying out such a control.

SUMMARY OF THE INVENTION

The present invention has been contrived in view of problems such as the above, and the object thereof is to enable control of printing according to both the kind of printing medium and the printing environment including the inside environment of the printer.

A main invention for solving the above-mentioned problem is a printing apparatus to which a printing medium may be set comprising read-in means and control means. The above-mentioned read-in means reads in printing-environment characteristic information recorded on a first recording device provided on the above-mentioned printing medium, the printing-environment characteristic information indicating a printing-environment characteristic of the printing medium. The above-mentioned control means controls a printing process based on the printing-environment characteristic information read in by the above-mentioned read-in means.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 4 is a diagram showing a pass-rest time-length table recorded on the roll-paper memory 13;

FIG. 7 is a diagram showing table-correcting-method information in a fifth modified example.

DESCRIPTION OF PREFERRED EMBODIMENTS

Figure 1:
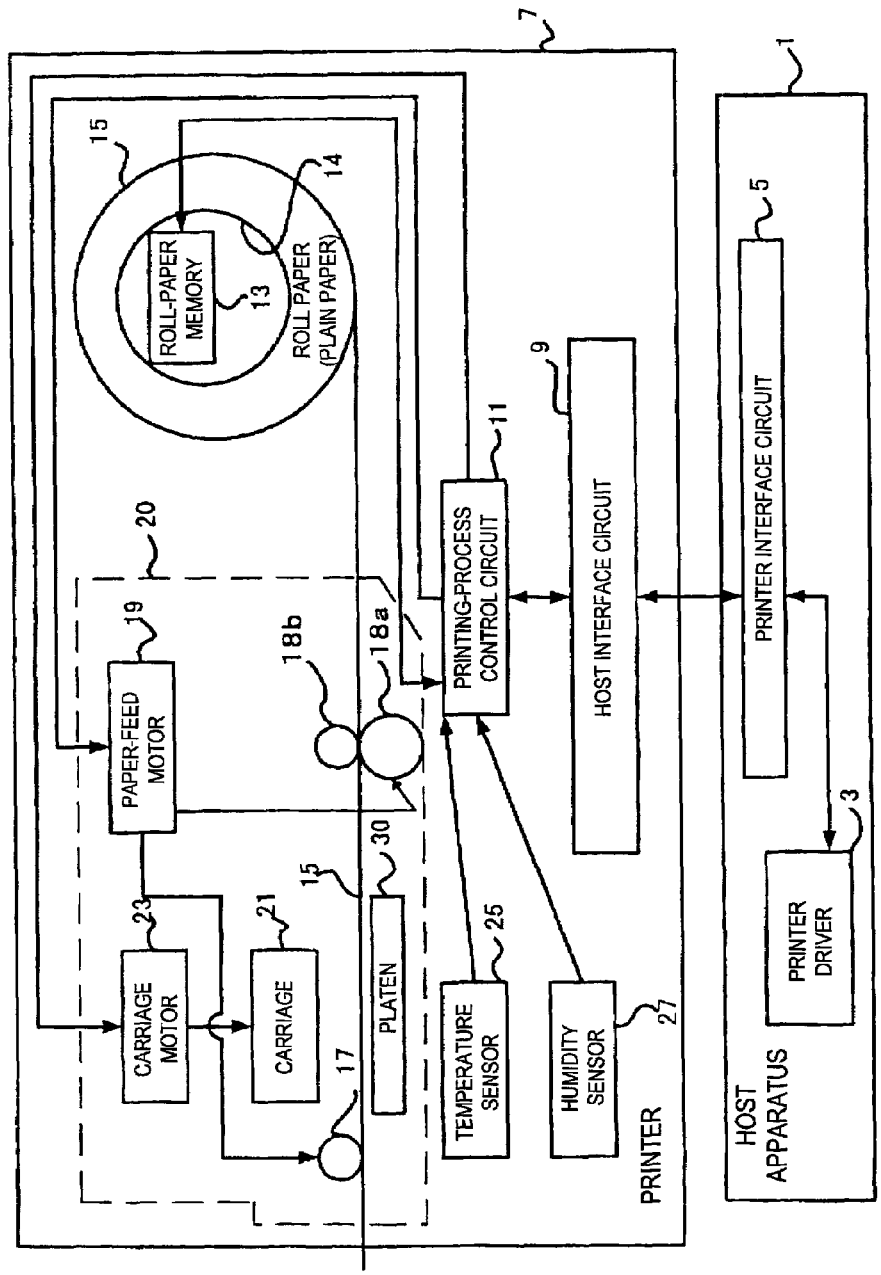
FIG. 1 is a diagram showing an overall structure of a printing apparatus according to one embodiment of the present invention.

At least the following matters will be made clear by the explanation in the present specification and the description of the accompanying drawings.

A printing apparatus according to a first aspect of the present invention is an apparatus to which a printing medium may be set, and comprises control means which is to be described later. A first recording device is provided on the printing medium, and printing-environment characteristic information indicating a printing-environment characteristic of the printing medium is recorded on the first recording device. The control means reads in the printing-environment characteristic information from the first recording device of the printing medium, and controls a printing process based on the printing-environment characteristic information having been read in.

In a first preferred embodiment according to a first aspect of the present invention, first adjustment information which is information for adjusting an ink duty or a color-conversion table according to at least either one of a temperature and a humidity is included in the printing-environment characteristic information; and the control means comprises: means for obtaining at least either one of a temperature and a humidity of a location where printing is conducted (this may be either inside or outside of the printer); and means for adjusting the ink duty or the color-conversion table according to at least either one of the temperature and humidity obtained, based on the first adjustment information in the first recording device.

In a second preferred embodiment according to a first aspect of the present invention, second adjustment information for adjusting a printing speed according to at least either one of a temperature and a humidity is included in the printing-environment characteristic information; and the control means comprises: means for obtaining at least either one of a temperature and a humidity of a location where printing is conducted; and means for adjusting the printing speed according to at least either one of the temperature and humidity obtained, based on the second adjustment information in the first recording device.

In a third preferred embodiment according to a first aspect of the present invention, the printing-environment characteristic information is provided for each kind of printer; and the control means controls the printing process based on the printing-environment characteristic information corresponding to the kind of printing apparatus.

In a fourth preferred embodiment according to a first aspect of the present invention, the printing apparatus comprises an ink-cartridge holder for exchangeably mounting at least one ink cartridge. A second recording device is provided on the ink cartridge, and ink-characteristic information indicating a characteristic of ink within the ink cartridge is recorded on the second recording device. Here, the control means reads in the ink-characteristic information from the second recording device of the ink cartridge set on the ink-cartridge holder, and controls the printing process based on both the ink-characteristic information having been read in and the printing-environment characteristic information in the first recording device.

In a fifth preferred embodiment according to a first aspect of the present invention, the printing medium is a rolled printing medium in which a continuous printing medium is wound; and the rolled printing medium can be exchangeably set to the printing apparatus.

In a sixth preferred embodiment according to a first aspect of the present invention, the printing-environment characteristic is a characteristic inherent in the printing medium.

A recording device according to a second aspect of the present invention is a recording device provided on a printing medium, and records thereon printing-environment characteristic information indicating a printing-environment characteristic of the printing medium.

In a first preferred embodiment according to a second aspect of the present invention, information for adjusting an ink duty or a color-conversion table according to at least either one of a temperature and a humidity is included in the printing-environment characteristic information.

In a second preferred embodiment according to a second aspect of the present invention, information for adjusting a printing speed according to at least either one of a temperature and a humidity is included in the printing-environment characteristic information.

In a third preferred embodiment according to a second aspect of the present invention, the recording device records thereon the printing-environment characteristic information for each kind of printing apparatus.

In a fourth preferred embodiment according to a second aspect of the present invention, the printing medium is a rolled printing medium in which a continuous printing medium is wound.

In a fifth preferred embodiment according to a second aspect of the present invention, the printing-environment characteristic is a characteristic inherent in the printing medium.

A method according to a third aspect of the present invention is an operation method of a printing apparatus to which a printing medium may be set, wherein the printing medium is provided with a recording device, and printing-environment characteristic information indicating a printing-environment characteristic of the printing medium is recorded on the recording device, comprising: a step of reading in the printing-environment characteristic information from the recording device of the printing medium; and a step of controlling a printing process based on the printing-environment characteristic information having been read in.

A recording medium according to a fourth aspect of the present invention is a recording medium on which a computer program for controlling an operation of a printing apparatus to which a printing medium may be set is recorded readable to a computer. The computer program makes a computer carry out: a step of reading in printing-environment characteristic information, indicative of a printing-environment characteristic, recorded on a recording device provided on the printing medium; and a step of controlling a printing process based on the printing-environment characteristic information having been read in.

Note that, as for a "printing apparatus" of the present invention, there is included, for example, a print system structured by a plurality of apparatuses (for example, a print system using a printer and a host apparatus), not to mention the printer itself. Further, a computer program of the present invention may be installed or loaded to a computer through various types of media such as a disk-type storage, a semiconductor memory, and a communication network.

Next, embodiments of the present invention will be explained with reference to the drawings.

FIG. 1 shows an overall structure of a printing apparatus according to one embodiment of the present invention.

In the same figure, a host apparatus 1 is connected to an inkjet printer (hereinafter referred to as printer) 7 through a printer interface circuit 5. The host apparatus 1 is typically a general-purpose computer such as a personal computer, and comprises a printer driver 3 which is a software carrying out processes for producing print data to be sent to the printer 7.

The printer 7 is connected to the host apparatus 1 through a host interface circuit 9. The printer 7 comprises a printing-process control circuit 11 which, for example, controls paper feed and/or produces a print image based on the print data transferred from the host apparatus 1 through the host interface circuit 9; and a printing mechanism 20 which conducts printing of the print image, produced by the printing-process control circuit 11, under the control of the printing-process control circuit 11.

Although not shown, the printing-process control circuit 11 comprises, for example, a print-head drive circuit; a motor drive circuit; a data-write circuit for reading and writing data to/from a roll-paper memory 13 described later; an I/O circuit for outer data; a CPU which controls the overall printing-process control circuit 11; a ROM storing, for example, programs for the CPU and/or fixed data; and/or, a RAM used as a receiving buffer for temporarily storing data from the host apparatus 1.

The printing mechanism 20 is structured from, for example, a carriage 21 comprising a not-shown print head; a carriage motor 23 for making the carriage 21 reciprocate in a direction perpendicular to the paper-feed direction; a paper-feed roller 18a which feeds a roll paper 15; a driven roller 18b which feeds the roll paper 15 with the paper-feed roller 18a; a platen 30; a paper-discharge roller 17 for assisting paper feed; a paper-feed motor 19 which makes the paper-feed roller 18a roll; not-shown gear mechanisms which transmit the rotation of the paper-feed motor 19 to the paper-feed roller 18a, the driven roller 18b, and the paper-discharge roller 17; and/or, a not-shown cutter for cutting the roll paper 15 at a predetermined position.

The carriage 21 is structured to be able to detachably mount not-shown ink cartridges for supplying ink to the print head. Note that the ink cartridges that can be mounted to the carriage 21 are, for example, the two types: a black-ink cartridge containing black (K) ink; and a color-ink cartridge containing ink of cyan (C), magenta (M), and yellow (Y). (Not to mention, the color-ink cartridge may be such in which ink of light cyan (LC) and light magenta (LM) is also stored other than the above-mentioned ink.) Further, as for the types of the ink cartridges, there exist an on-carriage type which is installed onto the carriage with the print head; and an off-carriage type which is set to an unmovable location apart from the carriage. The ink cartridges of the present embodiment may be either type. Further, the ink cartridge can be shared among a plurality of printers; for example, after mounting the cartridge to a certain printer and using it for a while, the cartridge may be removed and be remounted to another printer.

The paper-feed roller 18a and the driven roller 18b are arranged upstream, in terms of the paper-feed direction, from the position in which the dots are formed, and the paper-discharge roller 17 is arranged downstream from the position in which the dots are formed. That is, the paper-discharge roller 17 will contact the ink discharged upon the roll paper 15. Thus, if the ink discharged upon the roll paper 15 is not dry, there may arise a situation in which the ink adheres to the paper-discharge roller 17, and the ink adhering to the paper-discharge roller 17 will be applied to the roll paper 15 as a result of one revolution of the paper-discharge roller 17. (Hereinafter, this will be referred to as "ink transfer"). As will be described below, in the present embodiment, as one type of printing control, a control to prevent such an ink transfer is carried out.

Other than the above-mentioned parts, the printer 7 also comprises a temperature sensor 25 for detecting the temperature inside the printer 7, and/or a humidity sensor 27 for detecting the humidity inside the printer 7. In order to be able to detect the temperature and the humidity in the periphery of a position where the ink drops (dots) are formed, the temperature sensor 25 and the humidity sensor 27 are, for example, arranged in the vicinity of the above-mentioned position.

The printer 7 is structured to use paper 15 having been wound to the outer periphery of a cylindrical core 14. (Hereinafter, this is referred to as a "roll paper".) As for the types of roll papers 15, there are, for example, "plain paper", "paper for exclusive use", and "special-purpose sheets". "Plain paper" has substantially the same quality as a general copy paper. "Paper for exclusive use" is paper corresponding to a predetermined printing mode, and a best printing result may be obtained when printing to this paper for exclusive use with the above-mentioned printing mode. "Special-purpose sheets" are, for example, for obtaining a glossy image like a photograph, or for use in special purposes such as for stickers and/or OHPs, and some sheets are made not only of paper but of material other than paper. Note that in the present embodiment, the type of the roll paper 15 is to be "plain paper".

The roll paper 15 can be shared among a plurality of printers; for example, after mounting the roll paper to a certain printer and using it for a while, the paper may be removed and be remounted to another printer.

On the inner-peripheral surface of the core 14 of the roll paper 15, there is provided a memory (for example, an EEPROM, which is hereinafter referred to as "roll-paper memory") 13 on which predetermined information described later is recorded. The roll-paper memory 13 is, for example, a noncontact-type memory having a region in which data is arbitrarily erasable and a region in which data cannot be arbitrarily erased. For example, various information such as information concerning a remaining amount of roll paper, information on lot number, and information on production date are recorded on the memory 13. Further, on the memory 13, there are recorded the paper type of the roll paper 15 (thus, "plain paper" in the present embodiment), and printing-environment characteristic information corresponding to the paper type, such as, a printing-environment characteristic table explained below, a color-conversion table corresponding to ink duty described later, and a pass-rest time-length characteristic table. Note that access (data read/write) to the roll-paper memory 13 is carried out by the printing-process control circuit 11; and as an access mode therefor, in the present embodiment, for example, a mode described in paragraphs "0030"-"0032" of the specification and FIG. 1-FIG. 3 of Japanese Patent Application No. 2000-397634 which is a former application by the present applicant (and which has not been published at the time of filing of the present application) may be adopted. Note that the access mode can be an access mode established through contacts for communication, or an access mode that does not involve contacts, i.e., according to wireless communication.

Figure 2:
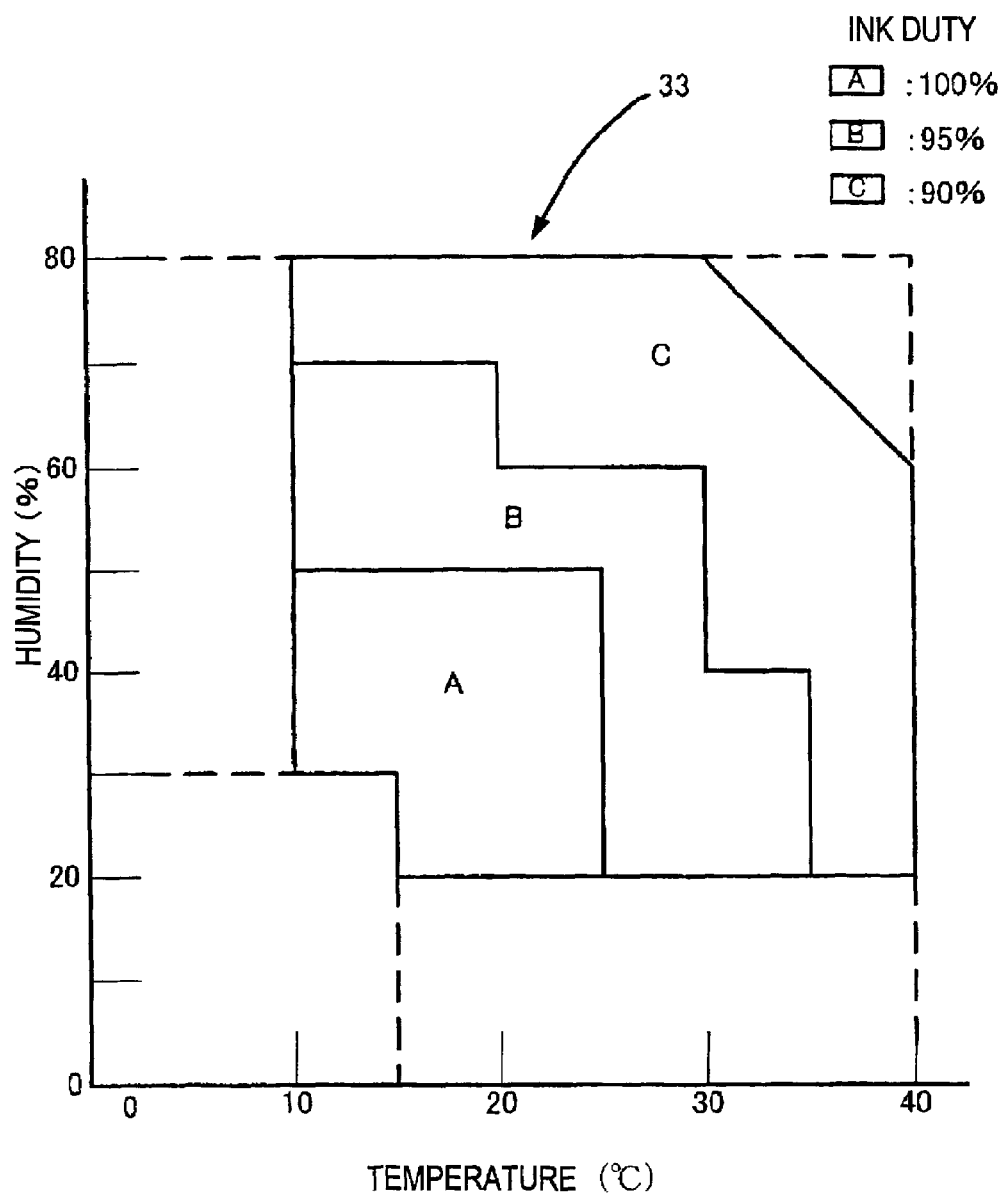
FIG. 2 is a diagram showing a printing-environment characteristic table which is recorded on a roll-paper memory 13.

FIG. 2 shows a printing-environment characteristic table which is recorded on the roll-paper memory 13.

The printing-environment characteristic table 33 shown in this figure is a printing-environment characteristic table corresponding to the paper type, "plain paper", of the roll paper 15. On the printing-environment characteristic table 33, there is recorded appropriate ink duties corresponding to the temperature and the humidity inside the printer 7 (that is, the temperature detected by the temperature sensor 25 and the humidity detected by the humidity sensor 27). According to this table 33, it can be appreciated that, for example, it is respectively appropriate that the ink duty is 100% if the temperature and the humidity level is at a low degree (for example, temperature: 20° C., humidity: 30%), the ink duty is 95% if it is at a medium degree (for example, temperature: 25° C., humidity: 55%), and the ink duty is 90% if it is at a high degree (for example, temperature: 40° C., humidity: 60%). (Since the table 33 described in this figure is only an example, there is no guarantee that the relation between the temperature and humidity and the ink duty described in this table 33 is correct.) Needless to say, the contents of the printing-environment characteristic table 33 can be freely redesigned according to the paper type of the roll paper 15. That is, for example, the classifications of ink duty do not have to be the three classifications 90%, 95% and 100% as in the figure, and the ranges of temperature and the humidity do not have to be within 0-40° C. and 0-80%.

Note that, "ink duty" as referred to in the present specification is a total value of recorded-area rates for each of the colored inks upon reproduction of a predetermined color using a plurality of colors of ink. (A "recorded-area rate" is a rate of occupancy of the ink drops, having penetrated into the roll paper 15 and dried, per unit area of roll paper 15.) From another viewpoint, it is possible to state that this is a total value of ink amount for each of the colored inks necessary to form one dot having a predetermined color.

Figure 3:
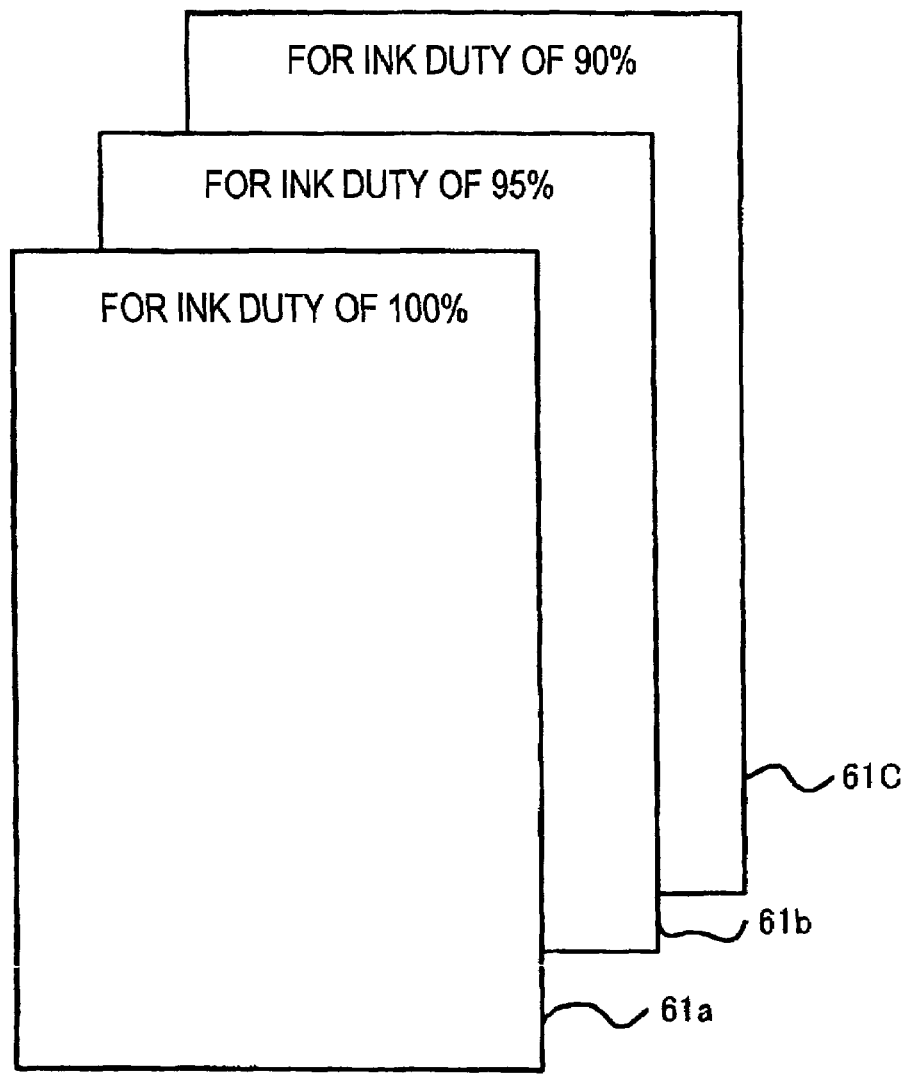
FIG. 3 is a diagram showing a color-conversion tables recorded on the roll-paper memory 13 corresponding to the respective ink duties.

FIG. 3 shows color-conversion tables recorded on the roll-paper memory 13 corresponding to the respective ink duties.

The color-conversion tables 61a, 61b, and 61c respectively corresponding to the respective ink duties 90%, 95%, and 100% are look-up tables for converting image data having an RGB color system into image data having a CMYK color system. The contents recorded on the respective tables 61a-61c are contents appropriate for the paper type "plain paper" of the roll paper 15. Further, the contents recorded on the respective tables 61a-61c differ respectively according to the ink duties. Specifically, in the respective color-conversion tables 61a-61c, even if the respective values in RGB are the same, the respective values in CMYK recorded on the color-conversion tables 61a-61c are different, respectively. (That is, even when reproducing the same color, the ink-blending amount for the respective CMYK colors for reproducing that same color is different according to the ink duty.)

FIG. 4 shows a pass-rest time-length table recorded on the roll-paper memory 13.

The pass-rest time-length table 51 shown in this figure is a table corresponding to the paper type "plain paper" of the roll paper 15. On this table 51, there is recorded a "pass-rest time length" corresponding to the temperature and the humidity inside the printer 7 (that is, the temperature detected by the temperature sensor 25 and the humidity detected by the humidity sensor 27). The pass-rest time length is recorded for each of the printing modes. Here, note that the printing modes executable by the printer 7 are, for example, the three types: the "normal printing mode", the "interlace printing mode" and the "interlace printing+singling printing mode".

The "normal printing mode" is a printing mode in which, when the total number of nozzles arranged in the print head in the paper-feed direction is n, printing of one line is carried out with one main-scanning pass using all n pieces of nozzles of the print head. (Note that in the present specification, when it is merely stated as "line", this signifies a line in which the n dots arranged in the paper-feed direction are aligned in a belt-like manner in the main-scanning direction. Contrary to this, a line in which one certain dot is aligned in the main-scanning direction is referred to as a "dot line", as described below.)

The "interlace printing model" is a printing mode in which, among the n pieces of nozzles, predetermined nozzles at a predetermined pitch of k dots (nozzles) are used to print one line with a plurality of times of main-scanning passes. (Here, k is a prime number smaller than n.) The "interlace printing+singling printing mode" is a printing mode that carries out printing with a larger number of main scans (passes) than the interlace printing mode by marking the dots with predetermined intervals therebetween upon printing each of the dot lines in the interlace printing mode (for example, where the total number of dots in one dot line is 720, a total of 360 dots are printed by printing every other dot).

According to the "interlace printing mode", since adjacent dots (ink) in the paper-feed direction are not printed simultaneously, and all of the dot lines are printed under the same condition, it is possible to make the boundary lines between each of the dot lines be in a uniform state, and it is possible to make the boundary line between these dot lines be evenly varied throughout the whole paper. Thus, it is possible to realize printing with a high image quality in which the boundary lines between the dot lines are made to be unobtrusive in the printed image. Further, according to the "interlace printing+singling printing mode", since the adjacent dots (inks) in both the paper-feed direction and in the main-scanning direction are not printed simultaneously, it is possible to realize printing with a higher image quality.

The above-mentioned "pass-rest time length" indicates a length of time in which the print head is to be rested, without being passed, from when a certain pass is started until when a next pass is to be started. The pass-rest time length is set from a viewpoint of, for example, prevention of: ink cohesion (in which the molecules of a plurality of wet ink drops are attracted and the ink drops adhere to each other); contamination of the paper-discharge roller 17 (in which the wet ink drops adhere to the paper-discharge roller 17); and/or the above-mentioned ink transfer caused thereby, which prevention being a result of complete drying of the ink drops discharged onto the roll paper 15. Accordingly, as shown in FIG. 4, the pass-rest time length is set to be a time length in which it is assumed that the discharged ink drops will certainly dry, according to both the paper type of the roll paper 15 ("plain paper" in this embodiment) and the temperature and humidity inside the printer 7. The pass of the print head is controlled according to the above.

Figure 5:
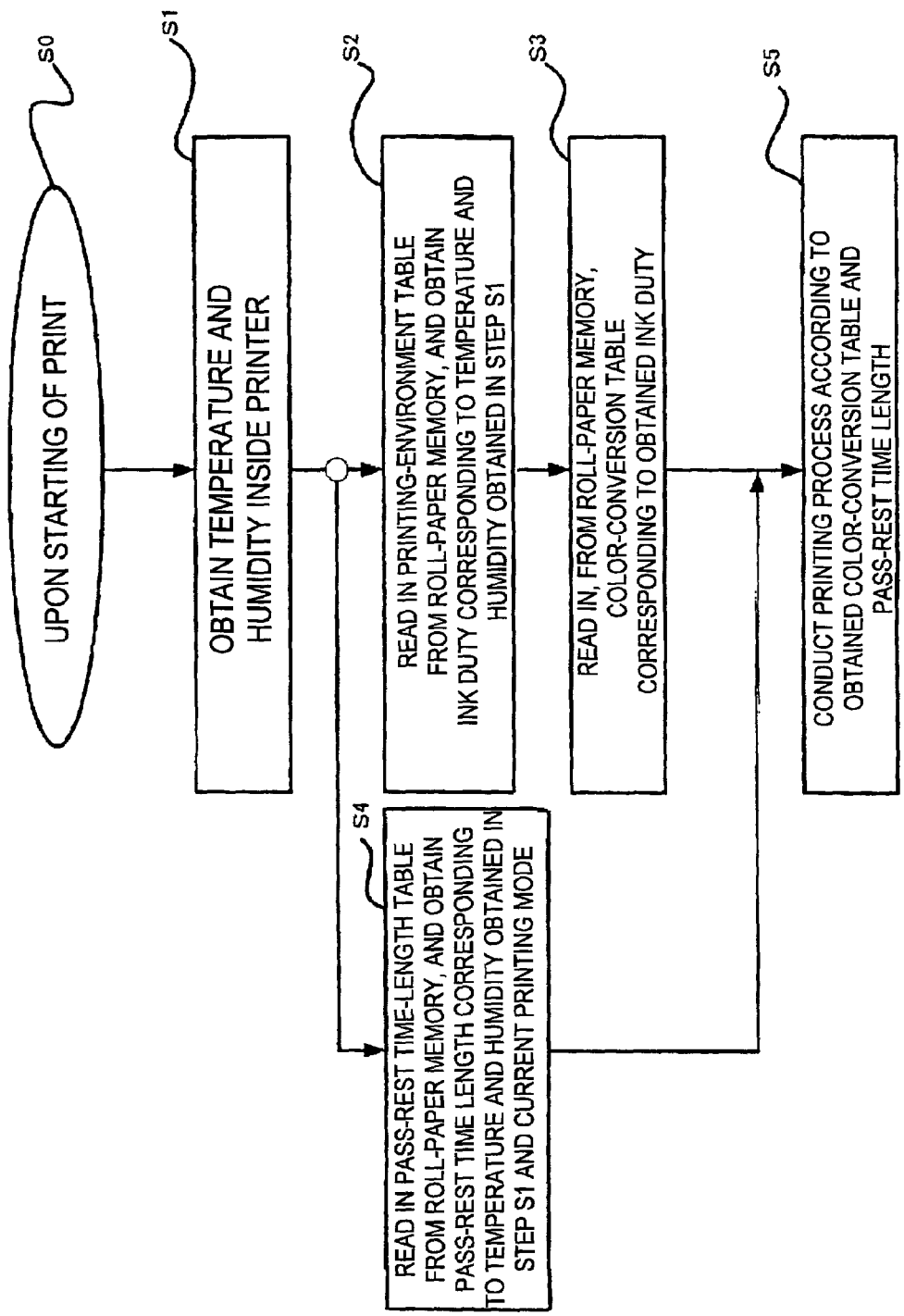
FIG. 5 is a flowchart showing a flow of printing control carried out in one embodiment of the present invention.

Below, the flow of printing control carried out in this embodiment will be explained with reference to FIG. 5.

Firstly, upon starting to print (step S0), the printing-process control circuit 11 obtains the temperature detected by the temperature sensor 25 and the humidity detected by the humidity sensor 17 (S1).

Next, the printing-process control circuit 11 reads in, from the roll-paper memory 13, and refers to the printing-environment characteristic table 33 (see FIG. 2) corresponding to the paper type "plain paper" of the roll paper 15, and obtains an ink duty corresponding to the temperature and humidity obtained in step S1 (S2). Then, the printing-process control circuit 11 reads in, from the roll-paper memory 13, the color-conversion table corresponding to the obtained ink duty among the color-conversion tables 61a-61c shown in FIG. 3 (S3).

Further, the printing-process control circuit 11 reads in, from the roll-paper memory 13, and refers to the pass-rest time-length table 51 (see FIG. 4) corresponding to the paper type "plain paper" of the roll paper 15, and obtains a pass-rest time length corresponding to the temperature and humidity obtained in step S1 and to the current printing mode (S4).

The printing-process control circuit 11 carries out the printing process and the control therefor according to the color-conversion table having been read-in in step S3 and the pass-rest time length obtained in step S4. Exemplifying specifically, the printing-process control circuit 11 sends to the printer driver 3 the color-conversion table having been read-in in step S3. The printer driver 3 produces a print image based on print data subjected to a color-conversion process according to the color-conversion table. Then, based on, for example, the printing mode specified by the user and/or the pass-rest time length obtained in step S4, the printing-process control circuit 11 controls, for example, the pass of the print head and/or the paper feed (i.e., the circuit controls, for example, the paper-feed motor 19 and/or the carriage motor 23) and prints the produced print image onto the roll paper 15.

As described above, according to the above-mentioned embodiment, the printing-environment characteristic table 33, the color-conversion tables 61a-61c, and the pass-rest time-length table 51, which correspond to the paper type of the roll paper 15, are stored in beforehand in the roll-paper memory 13; printing-control information such as ink duty, color-conversion table, and pass-rest time length is selected according to the above tables 33, 61a-61c, and 51, and the temperature and humidity inside the printer; and, for example, the total amount of ink for each of the ink colors necessary to form one dot and/or the rest-time length of the print head are controlled according to the selected printing-control information. Accordingly, it becomes possible to apply an appropriate amount of ink onto the roll paper 15, and/or, surely prevent ink cohesion and ink transfer, which may occur by passing of the print head or by feeding paper when the ink drops applied to the roll paper 15 are still wet, according to both the paper type and the temperature and humidity inside the printer. In other words, it is possible to reduce a difference in image quality that occurs according to a difference in paper type and/or the temperature and humidity inside the printer.

Further, according to the above-mentioned embodiment, the roll-paper memory 13 comprises the various tables 33, 61a-61c, and 51 corresponding to the paper type of the roll paper 15. Thus, since the printer driver 3 does not have to possess the various types of tables corresponding respectively to the plurality of paper types such as plain paper, glossy paper and/or iron-print sheet (that is, since the printer driver 3 does not have to possess many look-up tables), it is possible to economize on the necessary amount of memory in the host apparatus 1.

Further, according to the above-mentioned embodiment, since the various tables 33, 61a-61c, and 51 stored in the roll-paper memory 13 correspond to the paper type of the roll paper 15, there is no need to make the user designate the paper type, and thus, this would be convenient for the user.

Further, according to the above-mentioned embodiment, information indicative of the paper type of the roll paper 15 is stored in the roll-paper memory 13. Thus, in a case where the user is made to designate the paper type and a wrong type of paper is designated, by comparing and checking the designated paper type and the paper type recorded on the roll-paper memory 13, it becomes possible to detect that a wrong type of paper has been designated. Thus, there is no fear that a incorrect printing process will be carried out, and moreover, it will be possible to make a notification to that effect.

In the above explanation, the printing-process control circuit 11 is an example of the read-in means and also an example of the control means. Here, the read-in means reads in the printing-environment characteristic information recorded on the roll-paper memory 13, and the control means controls the printing process according to the printing-environment characteristic information having been read-in. The printing-process control circuit 11 can be realized on a single circuit board or can be realized on a plurality of circuit boards. Further, the printing-process control circuit 11 may structure the read-in means and/or the control means in cooperation with other component parts, or, component parts other than the printing-process control circuit 11 may structure the read-in means and/or the control means.

Above, a preferred embodiment of the present invention has been explained. However, the above is only an exemplification for explaining the present invention, and is not intended to limit the scope of the present invention only to this embodiment. The present invention may be implemented by other various embodiments.

For example, as a first modified example, it is possible to store only some of the tables among the various tables 33, 61a-61c, and 51 in the roll-paper memory 13, and store the other tables in, for example, external recording media such as memory cards and/or CD-ROMs, and/or servers located on communication networks. In this case, the other tables can be obtained by, for example, setting the external recording medium to the printer 7 or the host apparatus 1, or, having the printer 7 or the host apparatus 1 download the tables from the server via the communication network.

Figure 6A:
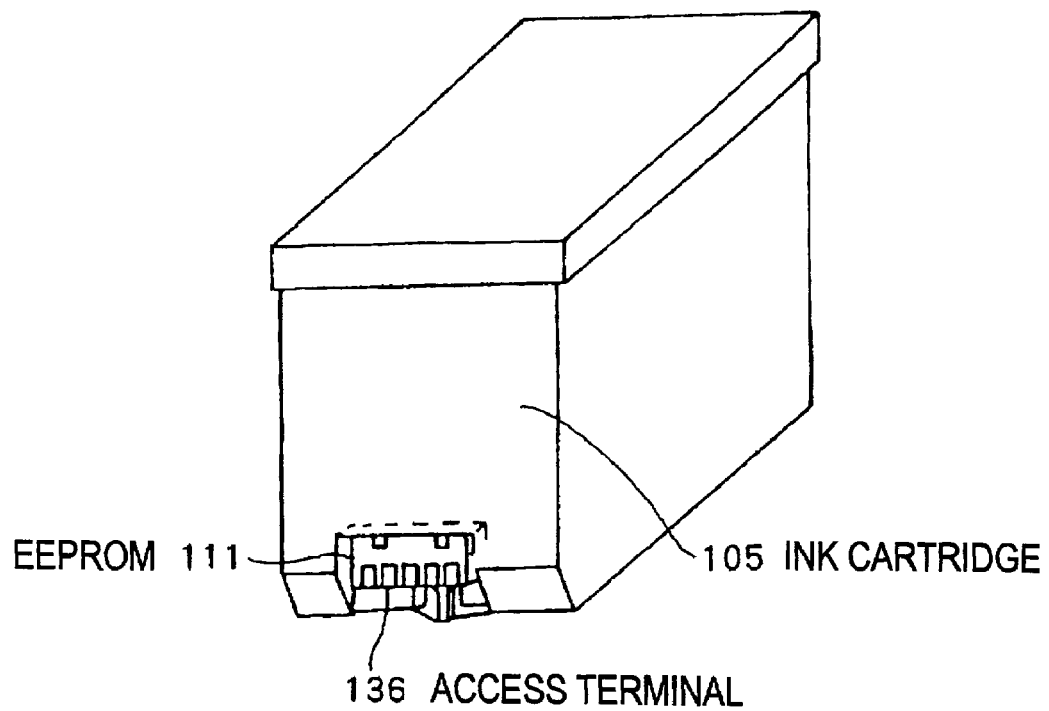
FIG. 6A is a diagram showing an ink cartridge.
Figure 6B:
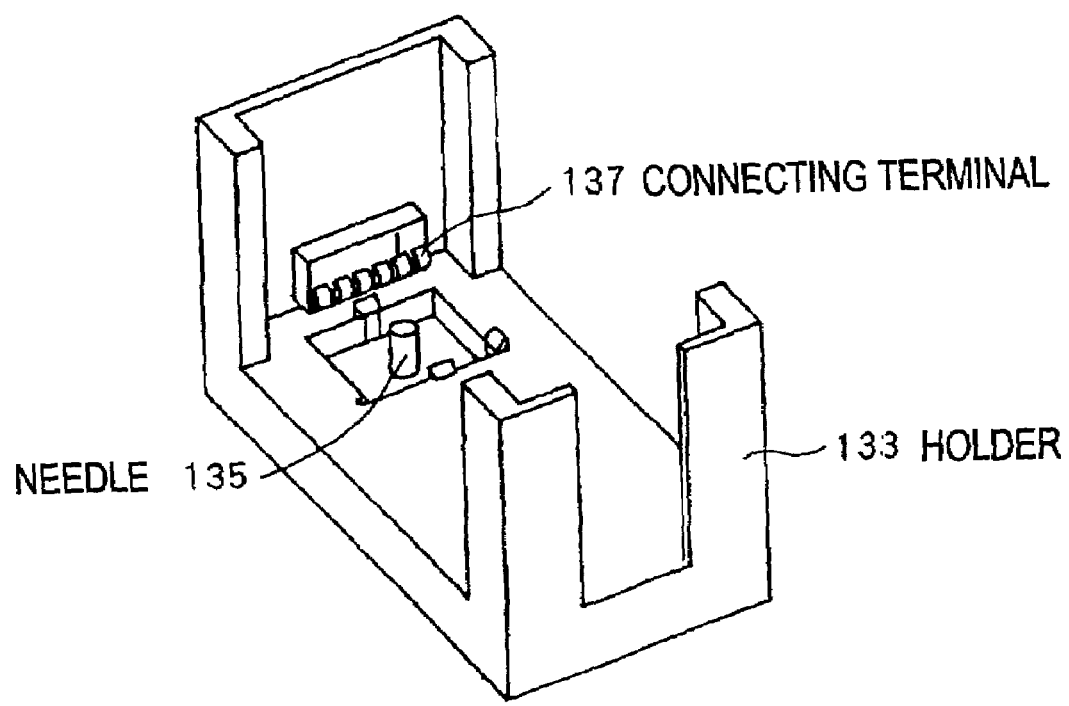
FIG. 6B is a diagram showing an ink-cartridge holder.

Further, as a second modified example, a recording medium such as an EEPROM is installed on the ink cartridge mounted to the carriage 21, and printing-environment characteristic information (for example, the above-mentioned printing-environment characteristic table 33 and/or the pass-rest time-length table 51) corresponding to characteristics of the ink within the ink cartridge (such as whether it is a dye or a pigment) is stored to the recording medium. The printing-process control circuit 11 combines this printing-environment characteristic information and the printing-environment characteristic information recorded on the roll-paper memory 13 (i.e., the printing-environment characteristic information corresponding to the paper type) in order to control, for example, the ink duty and/or the print-head pass. Here, an example of a combination of an ink cartridge and an ink-cartridge holder of this modified example is shown in FIG. 6A and FIG. 6B. FIG. 6A is a diagram showing the ink cartridge. FIG. 6B is a diagram showing the ink-cartridge holder. When the ink cartridge 105 is mounted to the ink-cartridge holder 133, a needle 135 pierces an ink pack within the cartridge 105 and ink is absorbed, and, an access terminal 136 of an EEPROM 111 of the ink cartridge 105 contacts a contact terminal 137 of the holder 133 to enable transmitting/receiving of electric signals between the EEPROM 111 and the printer 7. (That is, the printer 7 can read/write data to/from the EEPROM 111.) Needless to say, the method for exchanging electrical signals between the printer 7 and the EEPROM 111 may be a contact type as above, or may be a noncontact type, although particularly not shown.

Further, as a third modified example, instead of the printing-control flow shown in FIG. 5, a control flow as below may be taken.

That is, firstly, upon starting to print, the printing-process control circuit 11 obtains the temperature detected by the temperature sensor 25 and the humidity detected by the humidity sensor 27, and notifies the printer driver 3 of the obtained temperature and humidity.

The printer driver 3 commands the printing-process control circuit 11 to read in, from the roll-paper memory 13, and transfer the printing-environment characteristic table 33; refers to the printing-environment characteristic table 33 sent from the printing-process control circuit 11 in response to the command; and obtains an ink duty corresponding to the above-notified temperature and humidity. Then, the printer driver 3 commands the printing-process control circuit 11 to read in, from the roll-paper memory 13, and transfer the color-conversion table corresponding to the obtained ink duty, and holds the color-conversion table sent in response to this command.

Further, the printer driver 3 commands the printing-process control circuit 11 to read in, from the roll-paper memory 13, and transfer the pass-rest time-length table 51; refers to the pass-rest time-length table 51 sent in response to this command; and obtains a pass-rest time length corresponding to the above-notified temperature and humidity.

Then, the printer driver 3 executes the printing process and the control therefor according to the color-conversion table held as above and the pass-rest time length obtained as above.

As a fourth modified example, in the above-mentioned embodiment and the third modified example, the method of obtaining the temperature and humidity inside the printing apparatus may be as follows. That is, it is possible to, for example, make the user directly input the temperature (atmospheric temperature) and humidity outside the printer 7, and obtain the temperature and humidity inside the printer 7 by calculation (estimation) from the inputted temperature and humidity; or, make the user input information such as the present season, date, or geographic region, and obtain the temperature and humidity inside the printer 7 by calculation (estimation) based on the inputted information.

As a fifth modified example, the printing apparatus may be made to control such as the ink duty and/or print-head pass according also to the kind of printer, in addition to the paper type and printing environment inside the printer. As a specific example thereof, table-correcting-method information as shown in FIG. 7 may be provided in, for example, the roll-paper memory 13 or a Web server.

FIG. 7 shows the table-correcting-method information.

In the table-correcting-method information 41, there is information indicating whether or not to correct the above-mentioned various tables 33, 61a-61c, or 51 according to the kind of printer. According to the table-correcting-method table 41, it can be appreciated that, if the kind of printer 7 is "printer A", the printer can be used without correcting the various tables 33, 61a-61c, and 51; and if the kind of printer 7 is "printer B", the various tables 33, 61a-61c, and 51 need to be corrected respectively according to a predetermined method. In this case, if the kind of printer 7 is "printer B", the various tables 33, 61a-61c, and 51 read in from the roll-paper memory 13 are used after being respectively corrected according to a predetermined method.

In the fifth modified example, the printing apparatus stores data indicating the kind of printer 7 in a predetermined memory located in the printer 7, and upon printing, obtains information corresponding to the data with reference to the table-correcting-method information 41. The printing apparatus then controls, for example, the ink duty and/or the print-head pass according also to the kind of printer, in addition to the paper type and the printing environment inside the printer. Note that in this fifth modified example, it is possible to control printing also according to the printing-environment characteristic information corresponding to the characteristics of the ink, which is used in the above-mentioned second modified example.

In a sixth modified example, instead of preparing a plurality of color-conversion tables corresponding respectively to the plurality of ink duties, one color-conversion table (hereinafter referred to as "base color-conversion table") and correcting-method information for correcting the base conversion table respectively according to the respective plurality of ink duties are provided. When the printing-process control circuit 11 obtains an ink duty, it reads in, from the roll-paper memory 13, the base color-conversion table and the correcting-method information corresponding to the obtained ink duty, and corrects the base color-conversion table according to the correcting method indicated by the correcting-method information. Then, the color-conversion table obtained by correction is used in the printing process thereafter.

As other modified examples, the following examples may be exemplified.

Figure 8:
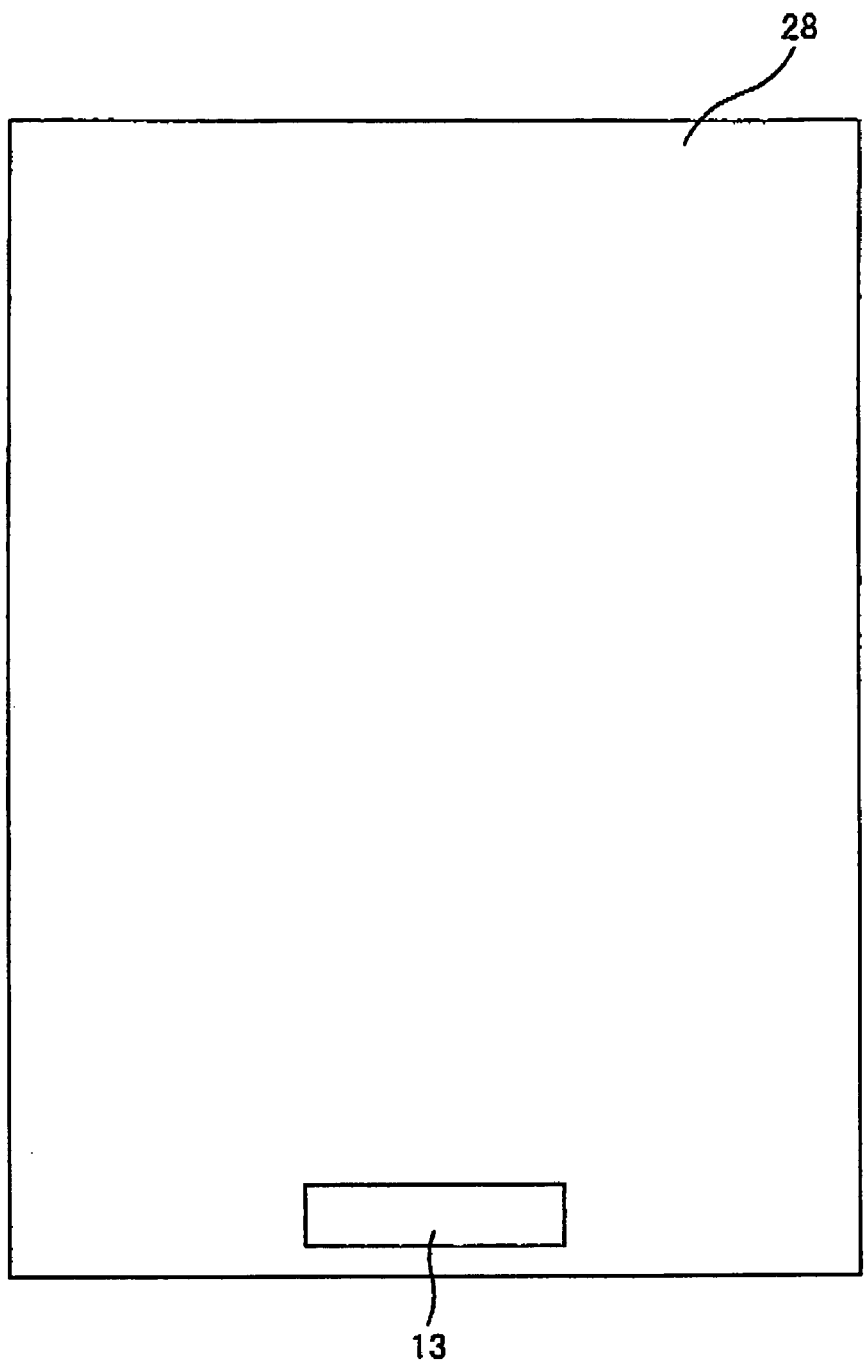
FIG. 8 is a diagram showing a single-sheet medium having a memory attached thereto.

As for the printing media, single-sheet media such as cut sheets and OHP sheets may be used other than rolled printing media. When using such a single-sheet medium, a printing medium provided with a recording device is realized by attaching the memory 13 to the single-sheet medium 28 itself, as shown in FIG. 8. Alternatively, a printing medium provided with a recording device is realized by, for example, attaching a memory to a packing box or a packing material for packing the single-sheet media. Note that in such a case, the packing box/packing material is mounted to the printer in a state where the single-sheet media are still packed, with a portion of the packing box/packing material being opened.

It is not necessary to obtain both the temperature and the humidity in the location where printing is carried out. A structure may be adopted where at least either one of the temperature or the humidity is obtained.

It is not necessary to adjust both the ink duty and the color-conversion table according to at least either one of the temperature and/or humidity obtained. A structure may be adopted where the ink duty or the color-conversion table is adjusted according to at least either one of the temperature and/or humidity obtained.

Although printing speed was adjusted by obtaining a pass-rest time length corresponding to at least either one of the temperature and/or humidity obtained, the printing speed may be adjusted by other methods.

What is claimed is:

1. A printing apparatus to which a printing medium may be set, comprising:
    read-in means for reading in printing-environment characteristic information recorded on a first recording device provided on said printing medium, said printing-environment characteristic information indicating a printing-environment characteristic of said printing medium; and
    control means for controlling a printing process based on the printing-environment characteristic information read in by said read-in means.

2. A printing apparatus according to claim 1, wherein,
    first adjustment information which is information for adjusting an ink duty or a color-conversion table according to at least either one of a temperature and a humidity is included in said printing-environment characteristic information; and
    said control means comprises:
        obtaining means for obtaining at least either one of a temperature and a humidity of a location where printing is conducted; and
        adjusting means for adjusting the ink duty or the color-conversion table according to at least either one of said temperature and humidity obtained, based on said first adjustment information in said first recording device.

3. A printing apparatus according to claim 1, wherein,
    second adjustment information for adjusting a printing speed according to at least either one of a temperature and a humidity is included in said printing-environment characteristic information; and
    said control means comprises:
        obtaining means for obtaining at least either one of a temperature and a humidity of a location where printing is conducted; and
        speed-adjusting means for adjusting the printing speed according to at least either one of said temperature and humidity obtained, based on said second adjustment information in said first recording device.

4. A printing apparatus according to claim 1, wherein,
    said printing-environment characteristic information is provided for each kind of printing apparatus; and
    said control means controls the printing process based on the printing-environment characteristic information corresponding to said kind of printing apparatus.

5. A printing apparatus according to claim 1, wherein,
    said apparatus comprises an ink-cartridge holder for exchangeably mounting at least one ink cartridge;
    a second recording device is provided on said ink cartridge;
    ink-characteristic information indicating a characteristic of ink within said ink cartridge is recorded on said second recording device; and
    said control means reads in said ink-characteristic information from said second recording device of said ink cartridge mounted on said ink-cartridge holder, and controls the printing process based on both said ink-characteristic information read in and the printing-environment characteristic information in said first recording device.

6. A printing apparatus according to claim 1, wherein,
    said printing medium is a rolled printing medium in which a continuous printing medium is wound; and said rolled printing medium can be exchangeably set to said printing apparatus.

7. A printing apparatus according to claim 1, wherein,
    said printing-environment characteristic is a characteristic inherent in said printing medium.

8. A recording device provided on a printing medium, having recorded thereon printing-environment characteristic information indicating a printing-environment characteristic of said printing medium, said printing-environment charac- 9. A recording device according to claim 8, wherein, information for adjusting an ink duty or a color-conversion table according to at least either one of a temperature and a humidity is included in said printing-environment characteristic information.

10. A recording device according to claim 8, wherein, information for adjusting a printing speed according to at least either one of a temperature and a humidity is included in said printing-environment characteristic information.

11. A recording device according to claim 8, wherein, said printing-environment characteristic information is recorded for each kind of printing apparatus.

12. A recording device according to claim 8, wherein, said printing medium is a rolled printing medium in which a continuous printing medium is wound.

13. A recording device according to claim 8, wherein, said printing-environment characteristic is a characteristic inherent in said printing medium.

14. An operation method of a printing apparatus to which a printing medium may be set, comprising:
a step of reading in printing-environment characteristic information recorded on a first recording device provided on said printing medium, said printing-environment characteristic information indicating a printing-environment characteristic of said printing medium; and
a step of controlling a printing process based on said printing-environment characteristic information read in.

15. A computer readable medium storing a control program to have a computer carry out a controlling method of a printing apparatus , the method comprising:
reading in printing-environment characteristic information recorded on a first recording device provided on said printing medium, said printing-environment characteristic information indicating a printing-environment characteristic of said printing medium; and
controlling a printing process based on said printing-environment characteristic information read in.

16. A printing medium comprising:
a recording device on which printing-environment characteristic information indicating a printing-environment characteristic of said printing medium is recorded, said printing-environment characteristic information being read in a printing-process control unit for controlling a printing process.

17. A printing medium according to claim 16, wherein, information for adjusting an ink duty or a color-conversion table according to at least either one of a temperature and a humidity is included in said printing-environment characteristic information.

18. A printing medium according to claim 16, wherein, information for adjusting a printing speed according to at least either one of a temperature and a humidity is included in said printing-environment characteristic information.

19. A printing medium according to claim 16, wherein, said recording device records said printing-environment characteristic information for each kind of printing apparatus.

20. A printing medium according to claim 16, wherein, said printing medium is a rolled printing medium in which a continuous printing medium is wound.

21. A printing medium according to claim 16, wherein, said printing-environment characteristic is a characteristic inherent in said printing medium.

22. A printing apparatus to which a printing medium may be set, comprising:
a control circuit,
wherein the control circuit:
reads in printing-environment characteristic information recorded on a first recording device provided on said printing medium, said printing-environment characteristic information indicating a printing-environment characteristic of said printing medium; and
controls a printing process based on the printing-environment characteristic information read in.

23. The printing apparatus according to claim 22, wherein,
first adjustment information for adjusting an ink duty or a color-conversion table according to at least one of a temperature and a humidity of said printing apparatus, is included in said printing-environment characteristic information; and
said control circuit further:
obtains at least one of a temperature and a humidity of a location where printing is conducted; and
adjusts, based on said first adjustment information in said first recording device, the ink duty or the color-conversion table according to at least one of said temperature and said humidity obtained at said location where printing is conducted.

24. The printing apparatus according to claim 22, wherein,
second adjustment information for adjusting a printing speed according to at least one of a temperature and a humidity of said printing apparatus is included in said printing-environment characteristic information; and
said control circuit further:
obtains at least one of a temperature and a humidity of a location where printing is conducted; and
adjusts, based on said second adjustment information in said first recording device, the printing speed according to at least one of said temperature and said humidity obtained at said location where printing is conducted.

25. The printing apparatus according to claim 22, wherein,
said printing-environment characteristic information is provided for each kind of printing apparatus; and
said control circuit controls the printing process based on the printing-environment characteristic information corresponding to said kind of printing apparatus.

26. The printing apparatus according to claim 22, further comprising:
an ink-cartridge holder for removably mounting at least one ink cartridge;
a second recording device is provided on said ink cartridge;
ink-characteristic information indicating a characteristic of ink within said ink cartridge is recorded on said second recording device; and
said control means reads in said ink-characteristic information from said second recording device of said ink cartridge mounted on said ink-cartridge holder, and controls the printing process based on both said ink-characteristic information read in and the printing-environment characteristic information in said first recording device.

27. A printing apparatus according to claim 22, wherein,
said printing medium is a rolled printing medium in which a continuous printing medium is wound; and said rolled printing medium can be exchangeably set to said printing apparatus.

28. A printing apparatus according to claim 22, wherein,
said printing-environment characteristic is a characteristic inherent in said printing medium.

29. A printing apparatus to which a printing medium may be set, comprising:

a control circuit, wherein the control circuit:

reads in printing-environment characteristic information recorded on a first recording device provided with said printing medium, said printing-environment characteristic information indicating a printing-environment characteristic of said printing medium; and controls a printing process based on the printing-environment characteristic information read in.

* * * * *